United States Patent Office 3,829,422
Patented Aug. 13, 1974

3,829,422
1,4-SUBSTITUTED-PYRIMIDIN-2(1H)-ONES
Goetz E. Hardtmann, Florham Park, N.J., and Hans Ott, Klusweg, Basel-Land, Switzerland, assignors to Sandoz-Wander Inc.
No Drawing. Original application Nov. 26, 1968, Ser. No. 779,200, now Patent No. 3,663,698. Divided and this application Jan. 27, 1972, Ser. No. 221,380
Int. Cl. C07d 51/38
U.S. Cl. 260—251 R
10 Claims

ABSTRACT OF THE DISCLOSURE

Compounds of the class of 1-substituted-4-aryl-pyrimidin-2(1H)-ones, methods and intermediates for preparation of said compounds, and pharmaceutical methods and compositions based on said compounds and useful in therapy, for example, in the treatment of inflammation in animals.

This application is a division of Ser. No. 779,200, filed Nov. 26, 1968, now U.S. Pat. 3,663,698.

The present invention relates to methods and compositions employing 1,4-disubstituted-pyrimidin-2(1H)-ones, more particularly, 1-substituted-4-aryl-pyrimidin-2(1H)-ones, and having utility in therapy, for example, in the treatment of inflammation in animals. The invention also relates to certain novel 1-substituted-4-aryl-pyrimidin-2(1H)-ones and also to intermediates and processes for preparation of 1-substituted-4-aryl-pyrimidin-2(1H)-ones.

The compound which is 1-methyl-4-phenyl-pyrimidin-2(1H)-one has been heretofore disclosed by G. Mannich et al. Ber. 55, 365 (1922). No utility for said compound has been to our knowledge disclosed.

The present invention provides in one aspect thereof the method of treating inflammation in animals comprising administering thereto a pharmacologically effective amount of a compound of formula I:

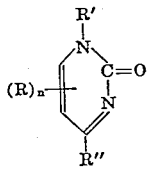

(I)

wherein
R is lower alkyl, preferably of 1 to 3 carbon atoms;
$n$ is 0 to 2;
R' is lower alkyl, preferably of 1 to 5 carbon atoms, e.g., methyl, ethyl, propyl, isopropyl, and isobutyl; allyl; methallyl; propargyl; benzyl; di(lower of 1 to 4 carbon atoms)alkylamino(lower of 1 to 4 carbon atoms)alkyl, e.g.,

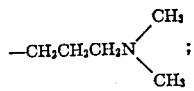

or carboxy(lower of 1 to 5 carbon atmos)alkyl, e.g.,

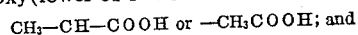

and

R'' is 2-thienyl, phenyl or substituted phenyl of the formula

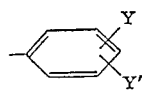

wherein
Y is halo, preferably of atomic weight no greater than 80; lower alkyl, preferably of from 1 to 4 carbon atoms; or lower alkoxy, preferably of 1 to 4 carbon atoms; and
Y' is hydrogen, halo, lower alkyl or lower alkoxy.

A procedure A suitable for preparation of the great majority of the compounds of formula I involves a Step A reaction of a 1-substituted-pyrimidin-2(1H)-one of formula II

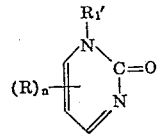

(II)

wherein R and $n$ are as above-defined and $R_1'$ is the same as R' excluding carboxyalkyl and propargyl, with an aryl lithium compound or an arylmagnesium halide respectively of the formulae III:

R''Li (IIIa) or R''MgX (IIIb)

wherein X is a Grignard halogen, e.g., chloro and bromo, preferably chloro, and R'' is as above-defined, the preferred compound III being R''Li, followed by hydrolysis in a conventional manner to obtain novel 3,4-dihydro-pyrimidin-2(1H)-ones of the formula IV:

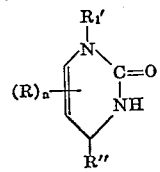

(IV)

wherein R, $R_1'$, R'' and $n$ are as above-defined, said compounds of formula IV then being subjected in a Step AA reaction to oxidization in a known manner, e.g., with an alkali metal permanganate or manganese dioxide, to obtain the corresponding 1-substituted pyrimidin-2(1H)-ones of the formula Ia:

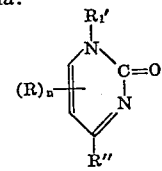

(Ia)

wherein R, $R_1'$, R'' and $n$ are as above-defined.

An alternate procedure B suitable for preparation of compounds of formula I including compounds I in which R' is propargyl but not employed for those in which R' is carboxyalkyl or a tertiary hydrocarbon substituent, e.g., tertiary butyl, involves the reaction of an alkali metal salt of an appropriately substituted 4-aryl-pyrimidin-2(1H)-one of formula V:

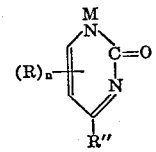

(V)

wherein R, R'' and $n$ are as above defined, and M represents an alkali metal, preferably sodium or potassium, with an organic halide of the formula VI:

$R_2'X$ (VI)

wherein $R_2'$ is the same as R' as above defined excluding tertiary alkyl and carboxyalkyl, and X is halogen, preferably of atomic weight not exceeding 127, e.g., chloro, bromo, and iodo, in an inert solvent to obtain the corresponding 1-substituted - 4 - aryl-pyrimidin-2(1H)-one of formula Ib:

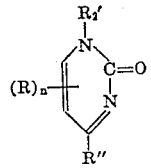

(Ib)

wherein R, $R_2'$, R'' and $n$ are as above defined.

The production of compounds Ia by Procedure A involves the Step A reaction of a compound II with a compound IIIa or IIIb which may be carried out in a conventional manner in the presence of an inert organic solvent and at temperatures in the range of 0° C. to 60° C., preferably 15° C. to 45° C., followed by hydrolysis in the known manner. Preferred solvents are those customarily employed in Grignard reactions, more preferably the ethers including, by way of illustration, tetrahydrofuran, dioxane, dimethoxyethane and diethyl ether. The particularly preferred compound of formula III for use in Step A is an aryl lithium compound of formula IIIa. The product compounds IV from Step A may be isolated by conventional procedures in suitable form for use independently or in Step AA, as desired.

Completion of the Procedure A for producing compound Ia in Step AA involves subjecting a compound IV to oxidation which may be conveniently carried out at temperatures in the range of from 20° C. to 150° C., preferably 40° C. to 100° C. Suitable oxidizing agents are those of conventional types, preferably an alkali metal permanganate such as sodium or potassium permaganate, or manganese dioxide of the well known "active" or oxidizing grades. The particularly preferred oxidizing agent found to reduce side reactions is manganese dioxide. The oxidation is carried out in a suitable inert liquid medium which is conveniently an organic solvent of conventional type, preferably dioxane, acetone, benzene, xylene and the like. The products compounds Ia may be isolated from the Step AA reaction by working up by conventional procedures.

Several of the 1-substituted-pyrimidin-2(1H)-ones employed as starting material in Step A are known compounds heretofore described in the literature, e.g., by D. J. Brown et al., J. Chem. Soc. *1965*, 4911. Such other of said compounds II which are not specifically known may be prepared from known materials by established procedures. Similarly, the compounds IIIa and IIIb are well known or can be readily prepared.

The preparation of compounds Ib by Procedure B involving reaction of the 1-metallo-4-aryl-pyrimidin-2(1H)-one of formula V with an organic halide of formula VI is conveniently carried out at temperatures in the range of from 10° C. up to about 100° C., preferably at about room temperature (20° C.) or at elevated temperature up to 80° C. The reaction is carried out in an inert solvent which may be any of several conventional types such that the solvent is conveniently the solvent employed in preparation of the starting metallo compound V. The organic halides VI are well known or readily prepared, and are preferably employed in the form of the bromide, chloride or iodide.

The 1-metallo salts of formula V employed in Procedure B are readily prepared by treating the corresponding 1-unsubstituted-4-aryl-pyrimidin-2(1H)-ones in a conventional manner with reagents commonly employed for preparing alkali metal salts, e.g., sodium hydride and alkali metal alkoxides such as sodium methoxide, sodium ethoxide, potassium methoxide, and potassium ethoxide. Such preparation of the 1-metallo salts which is preferably the sodium salt is carried out in an inert organic solvent which is preferably any of several of the conventional solvents conveniently suitable for both the salt preparation and use in the reaction of Preparation B. Such solvents include, by way of illustration, dimethylacetamide, dimethylformamide, and dioxane, more usually dimethylacetamide.

The compounds of formula I in which R' is carboxyalkyl are desirably prepared from the corresponding lower (1 to 4 carbon atoms) alkyl ester by subjecting said ester to hydrolysis in a conventional manner, preferably by treating with an aqueous alkali metal hydroxide solution in a lower alkanol solvent at room to reflux temperature in the temperature range of 20° C. to 90° C. The appropriate esters may be prepared by the reaction of Procedure B, as above-described, by reacting compound V with a carbalkoxyalkyl halide of formula VIa.

$$R_3'X \qquad (VIa)$$

wherein X is as above-defined and $R_3'$ represents carb-(lower of 1 to 4 carbon atoms)alkoxy(lower of 1 to 5 carbon atoms)alkyl, e.g.,

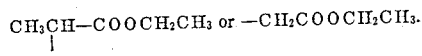

or

The 1-unsubstituted-4-aryl-pyrimidin-2(1H)-ones employed in preparation of the 1-metallo salts of formula V represent a class of compound generally disclosed in the literature, e.g., J. Chem. Soc. *1951*, 2323. Those 1-substituted-4-aryl-pyrimidin-2(1H)-ones not specifically disclosed may be prepared from known materials by disclosed procedures, for example, as exemplified hereinafter in Examples 6–11. See also A. Pasteur et al., Bull. Soc. Chim., *1965* (8), 2328-32.

Procedures A and B are well suited to preparation of compounds useful in the invention. We have preference for Procedure B for the general significances of R' in formula I while Procedure A is preferred in situations where R'' represents substituted phenyl or thienyl. However, the individual preferences of those skilled in the art may vary based on conventional consideration such as overall process efficiencies, cost and availability of the starting materials, equipment factors and the like.

Certain of compounds I as represented by those in which R' is dialkylaminoalkyl will have a basic nitrogen atom and thus may form acid addition salts, and may be produced and isolated as such acid addition salts, as desired or required. It will be evident that pharmaceutically acceptable acid addition salts not materially affecting the pharmacological effect of compounds I are also within the scope of the present invention. Such pharmaceutically acceptable salts may include, by way of illustration, the hydrochloride, fumarate, maleate, formate, acetate, sulfonate and malonate. The acid addition salts of the subject compound I may be produced from the corresponding free bases by conventional procedures known in the art.

The compositions of the invention are pharmaceutically useful because the compounds of formula I exhibit pharmacological activity in animals. In particular, the compositions are useful in relieving inflammatory manifestations in animals because compounds I are anti-inflammatory agents, as indicated, for example, by the Carrageenan-induced edema test on rats on oral administration at doses of 10–150 mg./kg. The compositions of the invention are also useful for relieving pain in animals because compounds I are also analgesics, as indicated, for example, by application of pressure to the yeast-inflamed foot of the rat on oral administration at doses of 10–150 mg./kg. The dosage of compounds I will, of course, vary depending upon the compounds used and the mode of administration. However, in general, satisfactory results are obtained when administered at a daily dosage of 1 milligrams to 150 milligrams per kilogram of body weight, preferably given in divided doses 2 to 4 times a day, or in sustained release form. For most mammals the administration of from 60 to 1500 milligrams of a compound of formula I per day provides satisfactory results and dosage forms suitable for internal administration comprise from about 15 milligrams to 750 milligrams of the compound in admixture with a solid or liquid pharmaceutical carrier or diluent.

For the above uses, the composition of the invention may be formulated in a conventional manner to contain an effective dose of a compound of formula I as active ingredient together with an inert pharmaceutically acceptable carrier adapted to provide a composition suitable for either oral administration or for administration parenterally in the form of an injectable solution or suspension.

In general, the preferred compositions are those adapted for oral administration and conventional forms for this purpose are suitable, such as tablets, dispersible powders, granules, capsules, syrups, elixirs and the like. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredients: | Weight (mg.) |
| --- | --- |
| 1-Methyl-4-phenyl-pyrimidin-2(1H)-one | 50 |
| Tragacanth | 10 |
| Lactose | 197.5 |
| Corn starch | 25 |
| Talcum | 15 |
| Magnesium stearate | 2.5 |

Compositions for parenteral administration may be formulated by well known methods to contain an effective amount of a compound I as active ingredient in a conventional inert carrier or suspension or solvent medium, together with other additives such as dispersing agents, wetting agents, buffering agents and other conventional ingredients, as desired.

A representative formulation for intravenous administration is a solution prepared by standard procedures and containing the following ingredients:

| Ingredient: | Weight (percent) |
| --- | --- |
| 1-Methyl-4-phenyl-pyrimidin-2(1H)-one | 5 |
| Ethanol, U.S.P. | 10–20 |
| Propylene Glycol | 15–25 |
| Water for Injection | 55–75 |

Sodium Chloride to make isotonic.
Buffer Agent to adjust pH.

In general, the compositions of the invention adapted for either oral or parenteral administration may contain 1% to 90% by weight of the active ingredient in combination with inert carrier.

From the standpoint of anti-inflammatory activity level the preferred compositions will contain a compound of formula I in which R' is methyl, more particularly the compound in which n is 0 and R'' unsubstituted phenyl. On the other hand, somewhat higher analgesic activity has been found to be exhibited by compounds in which R' is alkyl of 3 or 4 carbon atoms, e.g., isopropyl and tert.-butyl, especially t-butyl. It has also been found that compounds of formula I in which R' is alkyl other than methyl are useful as anti-convulsants, more particularly the compounds in which R' represents an alkyl of at least 3 carbon atoms, and especially when R' is a branched alkyl, e.g., isopropyl and tertiary butyl. The usefulness of such compounds as anticonvulsants is indicated, for example, by an inhibition of maximal electroshock induced convulsion in mice according to the method of Toman et al., J. Neurophysiol 9: 231 (1946) on interperitoneal administration at dosages of 50–200 mg./kg. The particular dosages for use as anti-convulsants will vary depending upon standard factors such as the particular compound employed and mode of administration. However, in general, satisfactory results may be obtained when administered at a daily dose of from 4 milligrams to 200 milligrams per kilogram of body weight. For most mammals the administration of from 280 to 2000 milligrams of the compound per day provides satisfactory results and dosage forms suitable for internal administration comprise from about 70 to 1000 milligrams of the compound. Compositions adapted for inhibiting convulsion in animals will contain the active compound together with an inert carrier or diluent adapted for either oral or parenteral administration according to the same conventional formulations and procedures applicable for other uses of the compounds of formula I, as above described.

The 3,4-dihydropyrimidin-2(1H)-ones of formula IV also are useful as anti-inflammatory and analgesic agents as indicated by the above-referred to animal tests. Such compounds may be administered to animal in the conventional forms and by the known methods above-indicated as suitable for the compounds of formula I. Daily dosages of the compounds of formula IV for animals generally range between 2–250 mg./kg. of body weight with daily dosages for mammals being in the range of 120 to 2500 milligrams and individual doses ranging from 30 to 1250 milligrams. The compounds of formula IV are less active pharmaceutically than their corresponding compounds of formula I as reflected by a comparison of the above-indicated dosages although it will be evident that comopunds IV have the feature of being subject to preparation by Step A of procedure A without the necessity of the additional reaction of Step AA.

The following examples show representative compounds encompassed within the scope of this invention and the manner in which such compounds are prepared. However, it is to be understood that the examples are for purposes of illustration only and are not intended as in any way limiting the scope of the invention.

EXAMPLE 1a

1-Methyl-4-phenyl-3,4-dihydropyrimidin-2(1H)-one

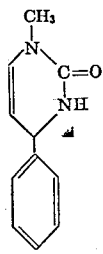

To a solution of 5.5 g. of 1-methyl-2-pyrimidone dissolved in 300 ml. dimethoxyethane and cooled to 0° is added dropwise with stirring 25 ml. of a 2.1 N solution of phenyl lithium in hexane. The mixture is stirred for an additional 3 hours at 0°, poured into water, and concentrated in vacuo to remove hexane and dimethoxyethane. The resulting crystalline precipitate is washed with water and dried to obtain 1-methyl-4-phenyl-3,4-dihydropyrimidin-2(1H)-one, m.p. 128–131° C.

EXAMPLE 1b

1-Methyl-4-phenyl-pyrimidin-2(1H)-one

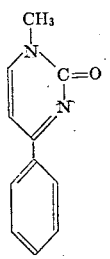

To a mixture of 1.88 g. of 1-methyl-4-phenyl-3,4-dihydropyrimidin-2(1H)-one dissolved in 150 ml. of dioxane is added dropwise with stirring 22 ml. of a potassium permanganate solution (prepared by adding 5.27 g. potassium permanganate to 100 ml. water). The resulting mixture is allowed to stand overnight at room temperature and is then filtered, and the clear filtrate evaporated in vacuo. The resulting mixture is filtered through a column of aluminum oxide (with methylene chloride), is crystallized from methylene chloride and again crystallized therefrom to obtain 1-methyl-4-phenyl-pyrimidin-2(1H)-one, m.p. 211–214° C., which is raised to m.p. 215–216° C. on two subsequent crystallizations from methanol.

EXAMPLE 2

1-Methyl-4-(2-thienyl)-pyrimidin-2(1H)-one

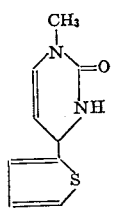

Step A: Preparation of 1-methyl-4-(2-thienyl)-3,4-dihydropyrimidin-2(1H)-one.—To a solution of 4.5 g. of absolute thiophene dissolved in 100 ml. absolute ether is added 31 ml. of 1.6 molar butyllithium (in hexane). The mixture is refluxed for 5 hours under dry nitrogen and there is added 100 ml. of absolute dimethoxyethane to displace the ether. The remaining solution is added dropwise to a prepared suspension of 5.5 g. N-methylpyrimidone in 500 ml. dimethoxyethane under stirring and the resulting mixture stirred for 30 minutes. There is then added 50 ml. of water and the mixture is evaporated to ¼ of its volume. An additional 150 ml. of water is added and a crystalline precipitate filtered off, washed with water, dried under high vacuum, and purified by crystallization from methanol to obtain 1-methyl-4-(2-thienyl)-pyrimidine-2(1H)-one, m.p. 145° C.–147° C.

Step B: Preparation of 1-methyl-4-(2-thienyl)-pyrimidin-2(1H)-one.—To a suspension of 4.6 g. of 1-methyl-4-(2-thienyl)-3,4-dihydropyridimidin-2(1H)-one in 250 ml. absolute benzene is added 4 g. of manganese dioxide and the resulting mixture refluxed for 24 hours under stirring. After cooling to room temperature there is added 100 ml. of methylene chloride/methanol (1:1) followed by filtering off the $MnO_2$, and evaporating the filtrate under reduced pressure. Purification by crystallizing the residue from methanol/ether (1:2) yields 1-methyl-4-(2-thienyl)-pyrimidin-2(1H)-one, m.p. 221–224° C.

EXAMPLE 3

4-Phenyl-1-tert.butyl-3,4-dihydropyrimidin-2(1H)-one

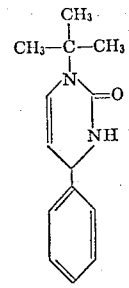

To a solution of 15.2 g. of 1-tert.butyl-pyrimidin-2(1H)-one in 800 ml. of absolute tetrahydrofuran is added dropwise 55 ml. of a 2.14 molar solution of phenyllithium with stirring at room temperature. The resulting mixture is stirred for two hours at room temperature, and evaporated in vacuo to dryness. The residue is dissolved in 200 ml. of methylene chloride, washed three times with 100 ml. of water, dried over anhydrous sodium sulfate and evaporated in vacuo to obtain 4-phenyl-1-tert.butyl-3,4-dihydropyrimidin-2(1H)-one, m.p. 117° C.–118° C.

EXAMPLE 4

4-Phenyl-1-tert.butyl-pyrimidin-2(1H)-one

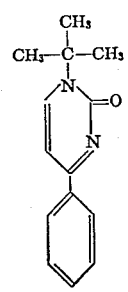

To a solution of 7 g. of 4-phenyl-1-tert.butyl-3,4-dihydropyrimidin-2(1H)-one in 500 ml. of absolute benzene is added 7 g. of manganese dioxide. The resulting mixture is refluxed for 16 hours, manganese dioxide filtered off and the resulting solution evaporated in vacuo to remove solvent. The residue is crystallized from petroleum ether to obtain 4-phenyl-1-tert.butyl-pyrimidin-2(1H)-one, m.p. 125 C.–126° C.

EXAMPLE 5

The preceding Examples illustrate preparation according to the Procedure A hereinbefore disclosed. By following the two step Procedure A as illustrated by the Examples, and substituting the appropriate starting materials in approximately equivalent amounts, one is able to prepare the following:

(a)

4-Phenyl-1-propyl-pyrimidin - 2(1H) - one, m.p. 129–132° C.
  (Crystallization from: ethanol)
  (Reaction Solvent: toluene)

(b)

1-Ethyl-4-phenyl-pyrimidin-2(1H)-one, m.p. 138–142° C.
  (Crystallization from: methylene chloride/diethyl ether)
  (Reaction solvent: benzene)

(c)

Step A: 1-Isopropyl - 4 - phenyl - 3,4 - dihydropyrimidin-2(1H)-one, m.p. 117–119° C.
  (Crystallization from: ethylacetate/pentane)
  (Reaction solvent: dimethoxy ethane)

Step AA: 1-Isopropyl-4-phenyl-pyrimidin - 2(1H) - one, m.p. 146–149° C.

(Crystallization from: methylene chloride/diethyl ether)
(Reaction solvent: benzene)

EXAMPLE 6

1-Isopropyl-4-phenyl-pyrimidin-2(1H)-one
(by Procedure B)

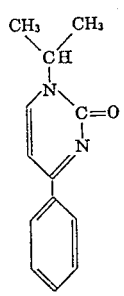

Step A: Preparation of sodium benzoylacetaldehyde.—A sodium ethoxide solution prepared by dissolving 5.8 g. of sodium in 100 ml. ethanol is evaporated in vacuo, and there is then added 500 absolute diethyl ether. There is then added with stirring a solution of 20 ml. of ethyl formate and 30 g. of acetophenone dissolved in 200 ml. of diethyl ether. The resulting mixture containing a white precipitate is stirred for 1 hour, filtered, and the precipitate washed with diethyl ether and dried under high vacuum at 80° C. for 4 hours to obtain sodium benzoylacetaldehyde.

Step B: Preparation of 2-amino-4-phenyl pyrimidine.—To a suspension of the sodium salt produced in Step A, above, in 450 ml. of pyridine is added 45 g. of guanidine nitrate, and the resulting mixture is refluxed for 7 hours. The resulting mixture is evaporated in vacuo to dryness, the residue treated with 100 ml. of 2N sodium hydroxide, filtered, the residue washed with 2N sodium hydroxide and then with water, and dissolved in 100 ml. of 2N hydrochloric acid. The resulting solution is made alkaline and then filtered to separate the resulting precipitate which is washed generously with water and then dried in high vacuum at 80° C. to obtain 2-amino-4-phenylpyrimidine, m.p. 162–165° C.

Step C: Preparation of 4 - phenyl-pyrimidin - 2(1H)-one.—To a solution of 42.6 g. of 2-amino-4-phenyl-pyrimidine dissolved in 2.5 liters of 6–7% sulfuric acid and cooled to 0–10° C. by an ice sodium chloride mixture is added dropwise a solution of 36 g. of sodium nitrite in 100 ml. of water. The resulting mixture is stirred for 2 hours at 0–10° C., and then allowed to stand 20 hours at 20° C. The resulting mixture is filtered, treated with concentrated ammonium hydroxide until pH 3, and the resulting precipitate filtered from the mixture, washed generously with water and dried in high vacuum at 80° C. to obtain 4-phenyl-pyrimidin-2(1H)-one, m.p. 238–244° C.

Step D: Preparation of 1-isopropyl-4-phenyl-pyrimidin-2(1H)-one.—To a solution of 15 g. of 4-phenyl-pyrimidin-2(1H)-one in 400 ml. of dimethylacetamide is added 2.4 g. of sodium hydride (57% in mineral suspension washed with pentane prior to use). The resulting mixture is stirred for ½ hour at room temperature and there is added 7.2 g. of isopropylbromide. This mixture is heated at 60–65° C. for 10 hours and evaporated in vacuo to dryness. The residue is dissolved in chloroform, and the solution washed three times with 100 ml. of water. The organic phase is dried over anhydrous sodium sulfate, evaporated in vacuo, and the residue crystallized from methylene chloride/pentane (1:1) to obtain 1-isopropyl-4-phenyl-pyrimidin-2(1H)-one, m.p. 146–149° C.

EXAMPLE 7

1-Carboxymethyl-4-phenyl-pyrimidin-2(1H)-one

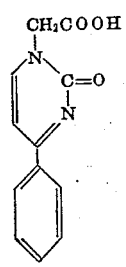

Following the procedure of Step D of Example 6, and employing equivalent amounts, 4-phenyl-pyrimidin-2(1H)-one is reacted first with sodium hydride and then with bromoethylacetate to obtain on crystallization from methylene chloride/pentane 1 - carbethoxymethyl - 4 - phenyl-pyrimidin-2(1H)-one, m.p. 125–127° C. This product (2.6 g.) is dissolved in 30 ml. of methanol and the resulting solution treated by addition of 20 ml. of 2N sodium hydroxide followed by refluxing for 5 hours. The resulting mixture is evaporated in vacuo to remove ethanol, and the remaining solution treated with sufficient 2N hydrochloric acid to bring to pH 4 and obtain a precipitate which is filtered off, washed generously with water and dried in high vacuum at 80° C. to obtain 1-carboxymethyl-4-phenyl-pyrimidin-2(1H)-one, m.p. 228–231° C.

EXAMPLE 8

1-(1-carboxyethyl)-4-phenyl-pyrimidin-2(1H)-one

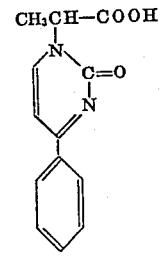

Following the procedure of Example 7, above, and substituting the appropriate organic halide and employing approximately equivalent amounts, there is obtained on crystallization from dioxane crystals of 1-(1-carboxyethyl)-4-phenyl-pyrimidin-2(1H)-one, m.p. 222–224° C.

EXAMPLE 9

1-Methyl-4-(4-chlorophenyl)-pyrimidin-2(1H)-one

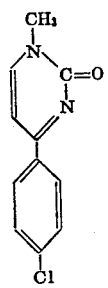

Following the procedure of Steps A–D of Example 6, and substituting the appropriate corresponding starting materials in approximately equivalent amounts, there is obtained in Step D (employing methyl iodide) on crystallization from methanol crystals of 1-methyl-4-(4-chlorophenyl)-pyrimidin-2(1H)-one, m.p. 227–230° C.

EXAMPLE 10

1,6-Dimethyl-4-phenyl-pyrimidin-2(1H)-one

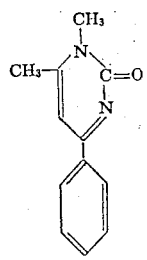

Following the procedure of Steps A–D of Example 6, and substituting the appropriate corresponding starting materials in approximately equivalent amounts, there is obtained in Step D on crystallization from methylene chloride/diethyl ether crystals of 1,6-dimethyl-4-phenyl-pyrimidin-(1H)-ones, m.p. 163—165° C.

EXAMPLE 11

Following the procedure of Step D of Example 6, above, and substituting the appropriate organic halide and employing approximately equivalent amounts, the following compounds are obtained:

(a)

1-ethyl-4-phenyl-pyrimidin-2(1H)-one, m.p. 138–142° C.
(Crystallization from methylene chloride/diethyl ether)
(Reaction solvent: dimethylacetamide)

(b)

1-allyl-4-phenyl-pyrimidin-2(1H)-one, m.p. 110–113° C.
(Crystallization from methylene chloride/pentane)
(Reaction solvent: dimethylacetamide)

(c)

1-(dimethylaminopropyl)-4-phenyl-pyrimidin-2(1H)-one maleate, m.p. 150–152° C.
(Crystallization from methylene chloride)
(Reaction solvent: dimethylacetamide)

(d)

4-phenyl-1-propargyl-pyrimidin-2(1H)-one, m.p. 158–161° C.
(Crystallization from methylene chloride/diethyl ether)
(Reaction solvent: dimethylacetamide)

(e)

1-benzyl-4-phenyl-pyrimidin-2(1H)-one, m.p. 220–223° C.
(Crystallization from ethanol)
(Reaction solvent: dimethylacetamide)

What is claimed is:

1. A compound of the formula

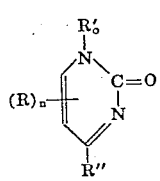

wherein
R is alkyl of 1 to 3 carbon atoms;
$n$ is 0 to 2;
$R_0'$ is branched alkyl of 3 to 5 carbon atoms, allyl, methallyl, propargyl, dialkylaminoalkyl in which each alkyl is of 1 to 4 carbon atoms, carboxyalkyl of 2 to 5 total carbon atoms, carbalkoxyalkyl in which the alkoxy is of 1 to 4 carbon atoms and the alkyl is of 1 to 5 carbon atoms or benzyl; is 2-thienyl, phenyl or substituted phenyl of the formula:

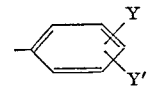

wherein
Y is halo of atomic weight no greater than 80, alkyl of 1 to 4 carbon atoms or alkoxy of 1 to 4 carbon atoms; and
Y' is hydrogen, halo of atomic weight no greater than 80, alkyl of 1 to 4 carbon atoms or alkoxy of 1 to 4 carbon atoms.

2. A compound of claim 1 in which $R_0'$ is isopropyl.

3. The compound of claim 2 in which R" is unsubstituted phenyl and $n$ is 0.

4. A compound of claim 1 in which $R_0'$ is tertiary butyl.

5. The compound of claim 4 in which R" is unsubstituted phenyl and $n$ is 0.

6. A compound of the formula:

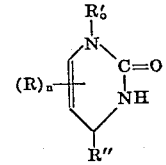

wherein
R is alkyl of 1 to 3 carbon atoms;
$n$ is 0 to 2;
$R_0'$ is alkyl of 1 to 5 carbon atoms, allyl, methallyl, benzyl or dialkylaminoalkyl in which each alkyl is of 1 to 4 carbon atoms,
R" is 2-thienyl, phenyl or substituted phenyl of the formula:

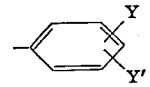

wherein
Y is halo of atomic weight no greater than 80, alkyl of 1 to 4 carbon atoms or alkoxy of 1 to 4 carbon atoms; and
Y' is hydrogen, halo of atomic weight no greater than 80, alkyl of 1 to 4 carbon atoms or alkoxy of 1 to 4 carbon atoms.

7. A compound of claim 6 in which R" is unsubstituted phenyl.

8. A compound of claim 7 in which $n$ is 0.

9. A compound of claim 6 in which $R_0'$ is alkyl.

10. A compound of claim 9 in which $R_0'$ is branched alkyl.

References Cited

Mannich et al.; C. A. 16: 2498–9 (1922).

NICHOLAS S. RIZZO, Primary Examiner

R. V. RUSH, Assistant Examiner

U.S. Cl. X.R.

260—256.5 R